Oct. 9, 1962  P. H. HULSE ETAL  3,057,171

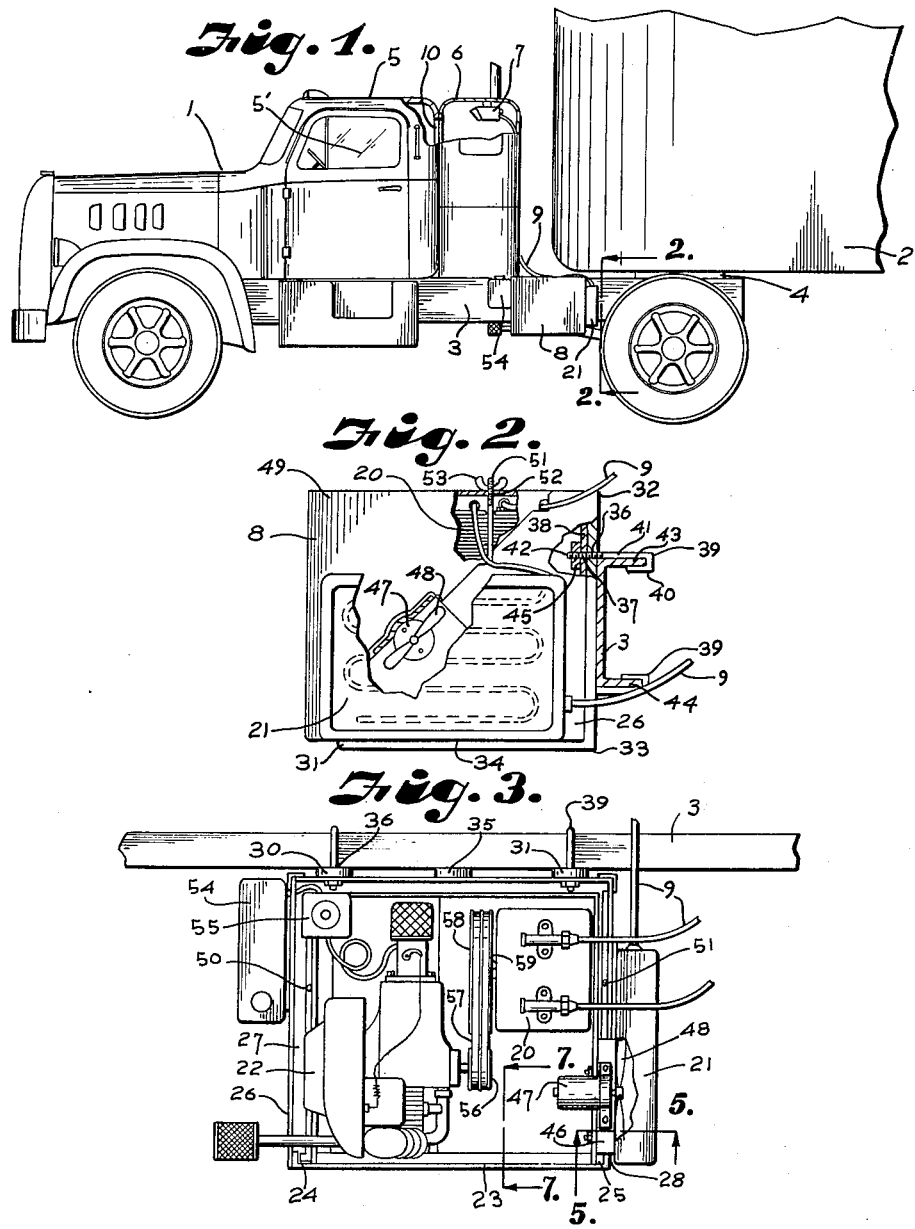

REFRIGERATION APPARATUS FOR TRUCK

Filed July 5, 1960  2 Sheets-Sheet 2

INVENTORS
PAUL H. HULSE &
BY HALLIE CONARD

Fishburn and Gold
ATTORNEYS

United States Patent Office 3,057,171
Patented Oct. 9, 1962

3,057,171
REFRIGERATION APPARATUS FOR TRUCK
Paul H. Hulse, 3506 N. Belt, and Hallie Conard, 1809
15th St., both of St. Joseph, Mo.
Filed July 5, 1960, Ser. No. 40,932
2 Claims. (Cl. 62—239)

This invention relates to refrigeration apparatus for trucks, and more particularly to devices for air conditioning the cab and/or sleeper of large trailer trucks, for the purpose of adding to the comfort and safety of the drivers.

The principal objects of the present invention are: to provide a relatively portable air conditioning apparatus for trailer trucks which can be installed with a minimum of effort and is easily transferable from one truck to another; to provide such an apparatus operable independently of the truck engine; to provide such a device so constructed that installation can be made without mutilating the cab or damaging the truck frame members; to provide such a device in which the refrigerant unit is mounted on a supporting frame having lateral extending runners contained in guides, permitting the refrigerant unit to be shifted from a normal position to an inspection position for maintenance; to provide such a device having a removable cover which protects weather-sensitive parts while permitting the condenser to remain uncovered for increased efficiency but yet maintaining the condenser as an integral part of the refrigerant unit; and to provide such a device which is inexpensive to build and economical and reliable in operation.

Other objects and advantages of this invention will become apparent from the following description taken in connection with the accompanying drawings wherein are set forth by way of illustration and example certain embodiments of this invention.

FIG. 1 is a side elevation of a typical trailer truck adapted with this invention.

FIG. 2 is a view taken on the line 2—2, of FIG. 1, showing the refrigerant unit of this invention with parts broken away.

FIG. 3 is a top view of the refrigerant unit with the cover removed.

Figure 4:
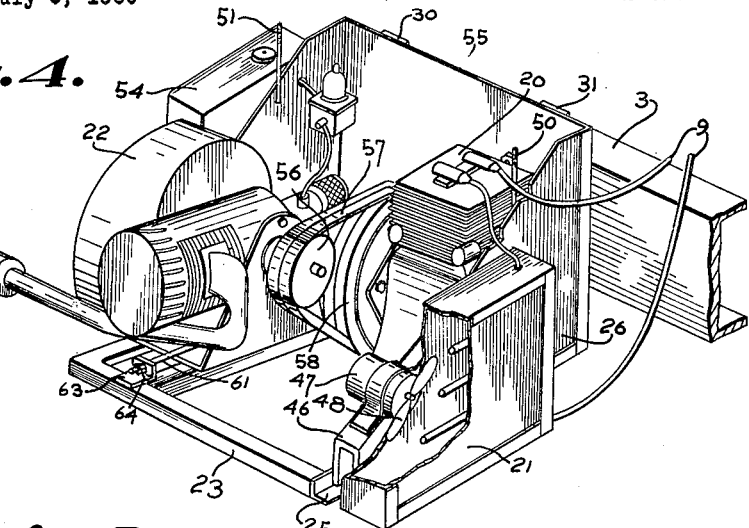
FIG. 4 is a perspective view of the refrigerant unit of this invention in the extended or inspection position with the cover removed.

Referring to the drawings in more detail:

1 designates a truck of the usual type for hauling a trailer 2. The truck 1 has an exposed horizontal channel frame member 3 which supports the connecting apparatus 4 for the trailer 2. The truck 1 is operated by drivers who occupy a cab 5. In the example shown, the cab 5 contains a seat portion 5′ and a sleeper 6 in which a driver may rest during his relief periods.

The refrigeration apparatus of this invention comprises a cooling unit 7 operably connected to a refrigerant unit 8 by means of refrigerant lines 9. The cooling unit 7 is removably secured in the space to be cooled, which may be in the seat portion 5′ of the cab 5 or, as shown in the example, in the sleeper 6. An opening 10 permits cool air circulation between the seat portion 5′ and the sleeper 6.

The cooling unit 7 comprises a housing 11 having an air inlet 12 and an air outlet 13. The air outlet 13 is equipped with adjustable louvers 14 which are used to direct the air flow therefrom. An evaporator or cooling coil 15 is located in the housing 11 between the air inlet 12 and the air outlet 13. An electric motor 16 rotates a fan 17 adjacent the air inlet 12. The fan 17 moves air into the housing 11 from the air inlet 12, through the cooling coil 15 and out the air outlet 13 to cool the cab 5 and sleeper 6. The housing 11 is equipped with a pan 18 to permit the collection of condensate water produced by the cooling coil 15. A drain tube 19 communicates with the pan 18 and terminates outside the sleeper 6 for discharging the condensate water to the outside of the cab.

Figure 5:
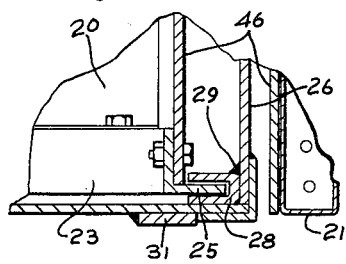
FIG. 5 is a view taken on the line 5—5, of FIG. 3, showing one lateral runner and guide for the frame mounting the refrigerant unit.
Figure 6:
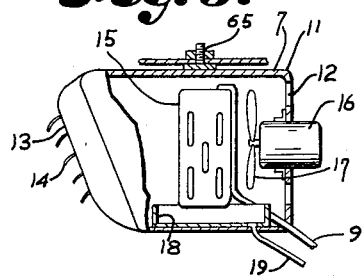
FIG. 6 is a view partly in section of the cab cooling unit.
Figure 7:
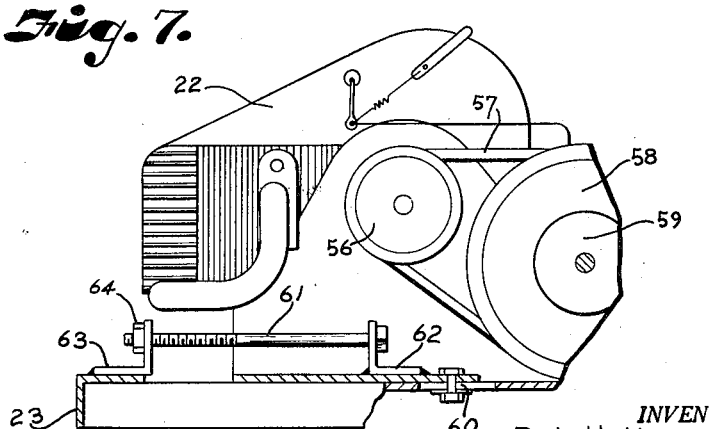
FIG. 7 is a view taken on the line 7—7, of FIG. 3, showing the drive belt adjusting feature of the refrigerant unit mounting frame.

The refrigerant unit 8 comprises a compressor 20, a condenser 21 and an air cooled internal combustion engine 22 for driving the compressor 20. The engine 22 may be of the two or four cycle type. The refrigerant unit 8 is secured upon a mounting frame 23 having laterally extending runners 24 and 25. A support housing 26 having opposed C-shaped guides 27 and 28 respectively contain the runners 24 and 25 and permit the mounting frame 23 to be shifted from a normal or operating position, as shown in FIG. 3, to an extended or inspection position, as shown in FIG. 4. The guides 27 and 28 are suitably secured to the support housing 26, for example, by welding 29 (FIG. 5).

Braces 30 and 31 provide greater strength and rigidity for the housing 26 and are composed of heavy metal strips which extend from a point 32 on the upper rear corner of the housing 26 downwardly around the lower rear corner 33 and forwardly substantially across the under surface 34 of the housing 26 (FIG. 2). The braces 30 and 31 are parallel and spaced from each other, as indicated in FIG. 3, and are secured to the support housing 26 by suitable means such as welding. If greater support for the housing 26 is desired, additional braces, such as brace 35, may be used.

Receiving holes 36 are drilled into the braces 30 and 31 and are spaced from each other a vertical distance substantially equal to the vertical width of the truck frame 3. The holes 36 are coincident with openings 37 in the rear wall 38 of the housing 26 to permit access through the braces 30 and 31 into the housing 26. Elongated retaining members 39 are comprised of a hook portion 40, a shank portion 41 and a threaded end 42. The retaining members 39 are inserted into the holes 36 and openings 37 with the hook portion 40 extending around the outer edges of the horizontal legs 43 and 44 of the truck frame 3. Nuts 45 screwed upon the threaded ends 42 removably secure the support housing 26 to the frame 3.

An inverted U-shaped bracket 46 secures the condenser 21 to the mounting frame 23, but permits the condenser 21 to remain outside of the support housing 26 for exposure to the cooling effects of the atmosphere. The bracket 46 also supports an electric motor 47 which rotates a fan 48 which may be used for forcing air through the condenser, particularly during periods when the truck 1 is not in motion. A housing cover 49 is provided to protect the engine 22, compressor 20 and the weather-sensitive parts thereof from the elements, but permits the condenser 21 to remain uncovered for the purpose noted above. Threaded rods 50 and 51 are secured to the sides of the housing 26, for example, by welding, and are received in suitable holes 52 in the cover 49. Wing nuts 53 secure the housing cover 49 in place but permit it to the easily removed. A gasoline tank 54 is secured to the housing 26 on the side opposite the condenser 21 and supplies gasoline through an electric fuel pump 55 to the engine 22.

The compressor 20 is driven by the engine 22 through the pulley 56, drive belts 57 and the compressor pulley 58. An electric clutch 59 located between the pulley 58 and compressor 20 permits disengagement of the compressor when desired such as during engine starting or for cab temperature control. If desired, a thermostat (not shown) may be used to control the electric clutch 59 for automatically regulating the air temperature in the cab and sleeper.

The engine 22 is slidably mounted in slots 60 in the frame 23, permitting movement with respect to the compressor pulley 58 for adjusting and changing the drive belts 57. A threaded adjusting rod 61 is anchored at one end on the frame of the engine 22 by means of a bracket 62, and the other end thereof extends through a bracket 63 secured to the frame 23. A nut 64 on the rod 61 bears against the bracket 63 to provide easy belt adjustment control.

The motors 16 and 47 and the fuel pump 55 are powered by the battery of the truck but constitute such a light load thereto that the refrigeration system of this invention may be operated for long periods of time without danger of excessive drain to the battery.

The cooling unit 7 may be secured by any suitable means, such as bracket 65, to a wall or to the ceiling of the cab 5 or sleeper 6. Due to the small size and light weight of the cooling unit 7, it requires only a very small mounting hole or, in some cases, no mounting hole at all, being supported by any of several members accessible within the compartment, such as window molding screws or the like. This permits the mounting of the entire refrigerating apparatus with a minimum of damage to the truck since the exit hole for the refrigerant line 9 and drain tube 19 may be very small and the support housing 26 is mounted by the retaining members 39 without any frame alteration whatsoever.

It is apparent that the unique design of the refrigeration apparatus of this invention permits the same to be mounted upon and removed from trucks with a minimum of damage and with a maximum of ease. It is also apparent that the refrigeration apparatus of this invention operates independently of the truck engine, permitting the occupants to remain comfortable without shortening the time between expensive truck engine overhauls.

It is to be understood that while we have illustrated and described one form of our invention, it is not to be limited to the specific form or arrangement of parts herein described and shown except insofar as much limitations are included in the claims.

What we claim and desire to secure by Letters Patent is:

1. The combination with a semitrailer truck having an exposed horizontal channel frame member having horizontal legs and a cab with refrigerant evaporator cooling means therefor, of a refrigeration unit comprising, a refrigerant compressor, a condenser coil and a prime mover for driving said compressor, a mounting frame for said unit having runners extending laterally of said frame member, a support housing having guide members slidably retaining said runners whereby said unit is shiftable from a normal position to an inspection position, a removable cover for said support housing covering said compressor and prime mover but permitting said condenser coil to receive a draft of air, and retaining members having hooks extending around said legs and removably secured to said housing for removably retaining said support housing on said channel frame member without mutilation of said frame member.

2. The combination with a semitrailer truck having an exposed horizontal channel frame member having horizontal legs and a cab with refrigerant evaporator cooling means therefor, of a refrigeration unit comprising, a refrigerant compressor, a condenser coil and a prime mover for driving said compressor, a mounting frame for said unit having runners extending laterally of said frame member, a support housing having guide members slidably retaining said runners whereby said unit is shiftable from a normal position to an inspection position, braces on said housing extending vertically a distance greater than the width of said channel frame member and contacting said channel frame member, receiving holes in said braces coincident with openings in said housing, said holes being spaced from each other a vertical distance substantially equal to the vertical width of said frame member, a plurality of elongated retaining members each having a hook portion and a threaded end opposite said hook portion, said hook portions extending around said legs, said threaded portions extending through said receiving holes and openings into said housing, and nuts on said threaded ends, whereby said support housing is removably retained on said channel frame member without mutilation of said frame member.

References Cited in the file of this patent

UNITED STATES PATENTS

| | | |
|---|---|---|
| 2,185,034 | Melcher | Dec. 26, 1939 |
| 2,185,035 | Melcher | Dec. 26, 1939 |
| 2,497,785 | Melcher | Feb. 14, 1950 |
| 2,513,679 | Ritter | July 4, 1950 |
| 2,696,086 | Jones | Dec. 7, 1954 |
| 2,895,313 | Flick | July 21, 1959 |
| 2,910,840 | Miller | Nov. 3, 1959 |
| 2,918,806 | Krause | Dec. 29, 1959 |
| 2,977,774 | Ferris | Apr. 4, 1961 |